US012612307B2

(12) United States Patent
Pashkevich et al.

(10) Patent No.: US 12,612,307 B2
(45) Date of Patent: Apr. 28, 2026

(54) METHOD FOR PROCESSING HEXAFLUOROSILICIC ACID TO PRODUCE HYDROGEN FLUORIDE

(71) Applicant: OBSCHESTVO S OGRANICHENNOJ OTVETSTVENNOSTJU "NOVYE KHIMICHESKIE PRODUKTI", St. Petersburg (RU)

(72) Inventors: Dmitrii Stanislavovich Pashkevich, Saint-Petersburg (RU); Olesya Nikolaevna Voznyuk, Saint-Petersburg (RU); Ekaterina Sergeevna Kurapova, Saint-Petersburg (RU); Ilya Andreevich Blinov, Saint-Petersburg (RU); Pavel Sergeevich Kambur, Murino (RU); Valentin Valerievich Kapustin, Saint-Petersburg (RU)

(73) Assignee: OBSCHESTVO S OGRANICHENNOJ OTVETSTVENNOSTJU "NOVYE KHIMICHESKIE PRODUKTI" (RU)

( * ) Notice: Subject to any disclaimer, the term of this patent is extended or adjusted under 35 U.S.C. 154(b) by 1162 days.

(21) Appl. No.: 16/332,691

(22) PCT Filed: Jun. 21, 2018

(86) PCT No.: PCT/RU2018/000412
§ 371 (c)(1),
(2) Date: Aug. 30, 2021

(87) PCT Pub. No.: WO2019/216785
PCT Pub. Date: Nov. 14, 2019

(65) Prior Publication Data
US 2021/0395086 A1 Dec. 23, 2021

(30) Foreign Application Priority Data

May 8, 2018 (RU) ........................... RU2018117237

(51) Int. Cl.
*C01B 7/19* (2006.01)
(52) U.S. Cl.
CPC .................................... *C01B 7/193* (2013.01)
(58) Field of Classification Search
CPC .................................. C01B 7/193; C01B 7/19
See application file for complete search history.

(56) References Cited

U.S. PATENT DOCUMENTS 3,128,152 A * 4/1964 Secord .................... C01B 7/194
423/483
3,661,519 A * 5/1972 Driscoll ................ B82Y 30/00
423/341

OTHER PUBLICATIONS

Yu et al (Two-step ammoniation of by-product fluosilicic acid to produce high quality amorphous silica, Korean Journal of Chemical Engineering, 2000). (Year: 2000).*

* cited by examiner

*Primary Examiner* — Anthony J Zimmer
*Assistant Examiner* — Logan Laclair
(74) *Attorney, Agent, or Firm* — MASCHOFF BRENNAN

(57) ABSTRACT

The method includes neutralizing an aqueous solution of HSA with an alkaline agent to produce ammonium fluoride and subsequently combusting it in a fire of an oxygen-containing oxidant and a hydrogen-containing fuel. It is characterized by the alkaline neutralization, which occurs in two stages. In the first stage, the aqueous hexafluorosilicic acid solution is neutralized with an alkaline agent to obtain a suspension of the correspondent hexafluorosilicate in water, after which the water is removed from the suspension. In the second stage, solid hexafluorosilicate is treated with (Continued)

an ammonia-containing agent to produce an aqueous solution of ammonium fluoride. Its solid products are filtered, then the aqueous ammonium fluoride solution is burned in an oxygen-containing oxidant. Hydrogen fluoride and water are condensed from the combustion products, and then the hydrogen fluoride is extracted.

11 Claims, 1 Drawing Sheet

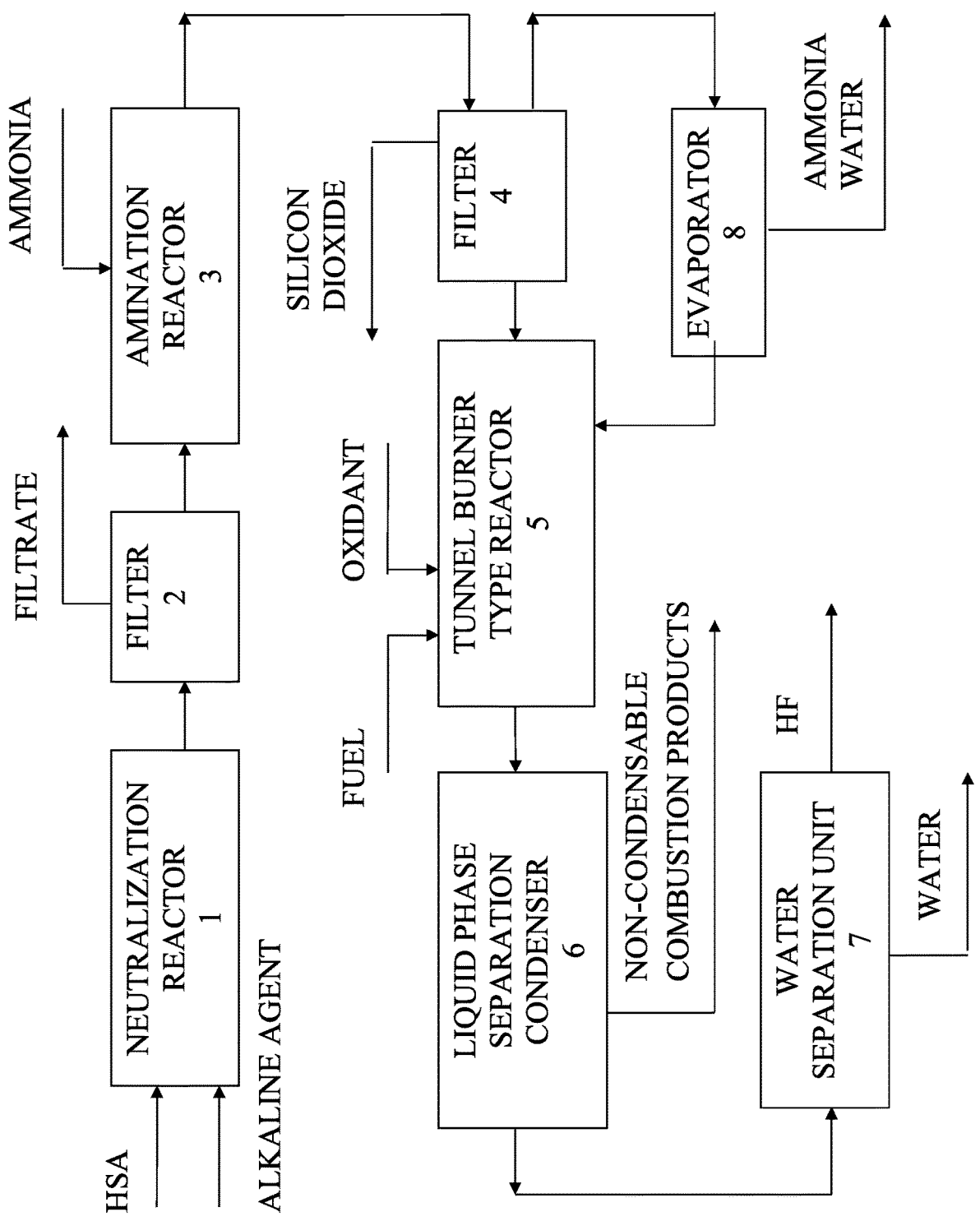

METHOD FOR PROCESSING HEXAFLUOROSILICIC ACID TO PRODUCE HYDROGEN FLUORIDE

CROSS-REFERENCE TO RELATED APPLICATIONS

This patent application is a section 371 nationalization of PCT Application No. PCT/RU2018/000412 filed Jun. 21, 2018, which claims priority to Russian Patent Application No. RU2018117237 filed May 8, 2018, which applications are each incorporated herein by specific reference in their entirety.

BACKGROUND

Field

This patent relates to the byproduct recovery of mineral raw materials in the chemical industry, namely, processing aqueous solutions of hexafluorosilicic acid (HSA) formed specifically during the process of producing phosphoric acid with hydrogen fluoride (HF).

Description of Related Art

HF is used as a feedstock in the production of Freon, uranium fluorides, fluoropolymers, synthetic oils, sand removal from metal castings, silica glass etching and more.

HSA forms during the process of obtaining wet-process phosphoric acid and is extracted from the production cycle as a 5-45% aqueous solution.

The known method [US patent U.S. Pat. No. 3,128,152A, IPC S01V 7/194, publ. 10.10.1961; Robert N. Secord, Carpenter Clifford LeRoy, Process for recovering hydrogen fluoride from aqueous fluorosilicic acid solution, Cabot Corp.] for producing HF by processing HSA is based on neutralizing an aqueous solution of HSA with an excess of ammonia or its aqueous solution, forming ammonium fluoride and silicon dioxide:

$$H_2SiF_6+6NH_4OH=6NH_4F+4H_2O+SiO_2. \qquad (1)$$

Solid silicon dioxide is extracted through filtration and washed repeatedly to remove ammonium fluoride from the surface of the crystals. Then the dilute ammonium fluoride solution is sent to the evaporator for an energy-consuming evaporation stage, which forms ammonium bifluoride, as in the equation:

$$6NH_4F=3NH_4HF_2+3NH_3 \qquad (2)$$

The discharged ammonia and water vapor are sent to the HSA neutralization stage. The ammonium bifluoride is oxidized with oxygen or an oxygen-containing agent, according to the equation:

$$4NH_4HF_2+3O_2=2N_2+8HF+6H_2O \qquad (3)$$

The water absorbs the resulting HF, creating its aqueous solution.

The main drawback to this method lies in its high energy consumption, which is caused by evaporating the water from the dilute ammonium fluoride solution introduced into the process with the aqueous HSA solution.

SUMMARY

The technical result achieved by applying the proposed patent consists in the reduction of energy costs due to the removal of water, which is introduced into the process cycle with the hexafluorosilicic acid, by way of synthesizing an intermediate hexafluorosilicate poorly soluble in water, then crystallizing and separating it from water through filtration, centrifugation or any other method that leads to a significant reduction in energy consumption at the stage of separating water from ammonium bifluoride in the evaporator.

BRIEF DESCRIPTION OF THE FIGURES

FIG. 1 displays a diagram of the unit used to produce hydrogen fluoride by treating hexafluorosilicic acid.

DETAILED DESCRIPTION

The essence of the proposed solution is a method for processing hexafluorosilicic acid to produce hydrogen fluoride, which consists of neutralizing an aqueous solution of HSA with an alkaline agent to produce ammonium fluoride and subsequently burning it with an oxygen-containing oxidizing agent and a hydrogen-containing fuel. The method is characterized by the alkaline neutralization, which occurs in two stages. In the first stage, the aqueous HSA solution is neutralized with an alkaline agent to obtain a suspension of the corresponding hexafluorosilicate in water, after which the water is removed from the suspension. In the second stage, solid hexafluorosilicate is treated with an ammonia-containing agent to produce an aqueous solution of ammonium fluoride. Its solid products are filtered, then the aqueous ammonium fluoride solution is burned in an oxygen-containing oxidant. HF and water are condensed from the combustion products, and the HF is extracted.

Ammonia or ammonia water may be used as the ammonia-containing agent.

A possible alternative to the primary technical solution would be to subject the ammonium fluoride solution to evaporation. The resulting dry ammonium bifluoride is sent for combustion in an oxygen-containing oxidant, then the separation of hydrogen fluoride and water occurs.

In this manner, a combination of the essential features achieves the claimed technical result. The energy consumption of evaporation is lowered since the significant volume of water introduced during the hexafluorosilicate filtration stage has been removed and the ammonium fluoride solution undergoes direct combustion.

Additional evaporation of the ammonium fluoride solution, with the aim of obtaining ammonium bifluoride, and its subsequent combustion in the presence of an oxygen-containing oxidant, increases the quantity of HF and decreases the water in the combustion products, which reduces reagent consumption when producing hydrogen fluoride from its aqueous solution and shortens the process duration.

In the first stage, NaOH, KOH, $NH_4OH$ or $NH_3$ is used as the alkaline agent at a reagent ratio of 1.8-2 moles of alkaline agent to 1 mole of HSA. In case $Na_2CO_3$, $K_2CO_3$, CaO or $Ca(OH)_2$ is used as the alkaline agent, then the reagent ratio is 0.9-1 moles of alkaline agent to 1 mole of HSA.

This method occurs as follows.

An appropriate alkaline agent, for example, NaOH, $Na_2CO_3$, KOH, $K_2CO_3$, CaO, $Ca(OH)_2$, $NH_4OH$ or $NH_3$, is continuously mixed into the initial solution of HSA in water. A poorly soluble hexafluorosilicate forms:

$$H_2SiF_6+2NaOH=Na_2SiF_6+2H_2O \qquad (4)$$

$$H_2SiF_6+Na_2CO_3=Na_2SiF_6+H_2O+CO_2 \qquad (5)$$

$$H_2SiF_6+2KOH=K_2SiF_6+2H_2O \qquad (6)$$

$$H_2SiF_6+K_2CO_3=K_2SiF_6+H_2O+CO_2 \qquad (7)$$

$$H_2SiF_6+CaO=CaSiF_6+H_2O \qquad (8)$$

$$H_2SiF_6+Ca(OH)_2=CaSiF_6+H_2O \qquad (9)$$

$$H_2SiF_6+2NH_4OH=(NH_4)_2SiF_6+2H_2O \qquad (10)$$

$$H_2SiF_6+2NH_3=(NH_4)_2SiF_6 \qquad (11)$$

A 3-10% molar excess of HSA is used in the process, as opposed to the stoichiometric value, so that the pH of the resulting solution falls in the 3-4 range. A solid dry salt is yielded from the suspensions formed as a result of the HSA neutralization in equations (4-11) through filtration, centrifugation, etc. The residual moisture content in the salt is 10-15%.

During the second stage, the solid hexafluorosilicate is aminated with ammonia in the presence of water or ammonia solution with a 10% molar excess and an aqueous solution of ammonium fluoride is separated from the solid products through filtration.

$$Na_2SiF_6+4NH_3+2H_2O \rightarrow 2NaF+SiO_2+4NH_4F \qquad (12)$$

$$K_2SiF_6+4NH_3+2H_2O \rightarrow 2KF+SiO_2+4NH_4F \qquad (13)$$

$$CaSiF_6+4NH_3+2H_2O \rightarrow CaF_2+SiO_2+4NH_4F \qquad (14)$$

$$(NH_4)_2SiF_6+4NH_3+2H_2O \rightarrow 6NH_4F+SiO_2 \qquad (15)$$

Calculations for the required amount of water are performed based on the solubility of ammonium fluoride at the selected temperature of the amination process.

Then the ammonium fluoride solution is fed into the combustion reactor with a fire of an oxygen-containing oxidant and a hydrogen-containing fuel, according to equation (16).

$$NH_4F_{(aqua)}+1.75O_2+0.5CH_4=0.5N_2+HF+2.5H_2O+ \\ 0.5CO_2 \qquad (16)$$

The resulting HF and water mixture is channeled to a water separation unit, which is either a distillation column, an apparatus for dehydrating HF with sulfuric acid or oleum [U.S. Pat. No. 5,300,709A, 15.01.1995], or a unit for high-temperature water recovery using carbon [Pashkevich D. S., Alekseev Yu. I., et al. Stability of Hydrogen Fluoride in a High-Temperature Zone of Water Recovery Using Carbon// Industry & Chemistry. 2015. T95, No. 5. p. 211-220], but is not limited to the listed options.

It is possible to develop an alternative to the technical solution, in which the ammonium fluoride solution is fed into the evaporator, where ammonium bifluoride forms with ammonia according to equation (2). Then the obtained dry ammonium bifluoride is fed to a tunnel burner type reactor, in which a mixture of HF and water forms in the presence of an oxygen-containing oxidant according to equation (3). This HF and water mixture is also sent to the water separation unit to produce anhydrous HF.

The proposed method makes it possible to reduce the amount of distilled water by at least twice when extracting fluorine in the form of HF from aqueous HSA solutions, which, in turn, lowers energy consumption by at least twice.

Producing hydrogen fluoride by treating hexafluorosilicic acid occurs on the apparatus shown in FIG. 1, where 1—neutralization reactor
2—filter
3—amination reactor
4—filter
5—tunnel burner type reactor 6—liquid phase separation condenser
7—water separation unit
8—evaporator The initial aqueous HSA solution is neutralized with an alkaline agent in neutralization reactor 1, where a suspension of the corresponding hexafluorosilicate forms. Next, the suspension is channeled to filter 2, where the hexafluorosilicate is separated from the filtrate. The solid salt is fed into amination reactor 3, where ammonia or its aqueous solution is dispensed, while mixing continuously, forming an aqueous ammonium fluoride solution. The ammonium fluoride solution is separated from the solid reaction products at filter 4.

Then the ammonium fluoride solution is fed into combustion reactor 5 with a flame from an oxygen-containing oxidant and a hydrogen-containing fuel. Next, the mixture of combustion products is sent to liquid phase separation unit 6, in which a hydrogen fluoride and water mixture is separated from the non-condensable combustion products. The resulting HF and water mixture is channeled to water separation unit 7, which is either a distillation column, an apparatus for dehydrating HF with sulfuric acid or oleum, or a unit for high-temperature water recovery using carbon, but is not limited to the listed options.

An alternative to the main process method is possible, in which the ammonium fluoride solution is sent to evaporator 8, where water and ammonia are stripped, and ammonium bifluoride forms. Ammonia formed is recycled to the hexafluorosilicate amination stage.

The ammonium bifluoride is directed into tunnel burner type reactor 5, where treatment in the fire of an oxygen-containing oxidant forms hydrogen fluoride, nitrogen and water. Next, the hydrogen fluoride and water mixture is sent to liquid phase separation unit 6 and separated from the non-condensable combustion products. The resulting HF and water mixture is channeled to water separation unit 7, which is either a distillation column, an apparatus for dehydrating HF with sulfuric acid or oleum, or a unit for high-temperature water recovery using carbon, but is not limited to the listed options.

This method makes it possible to process hexafluorosilicic acid to produce hydrogen fluoride, while achieving the claimed technical result of lowering the energy consumption of the process by significantly reducing the amount of evaporated water by two times or more.

EXAMPLES OF METHOD APPLICATION

Example 1

A typical waste from the production of phosphoric acid using extraction method is a 20.5% aqueous solution of HSA, which is fed into reactor 1 in the amount of 3.51 kg. With vigorous mixing, 0.8 kg of an aqueous solution of 50% NaOH is channeled into the same apparatus. The temperature in reactor 1 is maintained at 25° C. Reactor 1 discharges 4.31 kg of a suspension of sodium hexafluorosilicate in water to phase separator 2, which is a filter that separates 1.1 kg of solid sodium hexafluorosilicate from 3.21 kg of filtrate.

The solid salt is dispensed into amination reactor 3, where it is continuously mixed with 0.37 kg of ammonia gas and 0.96 kg of water, which are also fed to the reactor, forming silicon dioxide, sodium fluoride and ammonium fluoride.

The obtained suspension of silicon dioxide, calcium fluoride and ammonium fluoride solution is channeled into filter 4, where 0.85 kg of the solid amination products are separated from 1.98 kg of ammonium fluoride solution. To remove the ammonium fluoride solution residue from the precipitate, it is washed once with 0.4 kg of hot water. Next, the ammonium fluoride solution is directed to tunnel burner type reactor 5 at a flowrate of 157 mg/s through a pneumatic nozzle. Oxygen at a flowrate of 71 mg/s and methane at a flowrate of 10 mg/s are also fed to the reactor, forming a mixture of hydrogen fluoride, nitrogen and water. Next, the hydrogen fluoride and water mixture is sent to liquid phase separation unit 6, where it is separated from the non-condensable combustion products. Next, the mixture of HF and water is sent to water separation unit 7 to remove the water. This unit is a reactor, into which 98% sulfuric acid is fed in addition to the water-containing product, which produces HF, with a residual 0.02% water content and 75% sulfuric acid in the amount 28 kg per 1 kg of HF.

Therefore, the water in the HSA solution was removed by filtration, rather than evaporation, which created no energy costs for evaporating the solutions. The overall energy consumption was lowered by more than twice.

Example 2

In neutralization reactor 1, 3.45 kg of 45% aqueous HSA solution, with continuous mixing, is neutralized with 0.561 kg of CaO. Next, 4.01 kg of calcium hexafluorosilicate suspension is discharged from reactor 1 and sent to filter 2, where 1.888 kg of calcium hexafluorosilicate is separated from 2.123 kg of filtrate.

Therefore, the water in the HSA solution was removed by filtration, rather than evaporation.

The solid salt is dispensed into amination reactor 3, where it is continuously mixed with 0.356 kg ammonia gas and 2.176 kg of 25% aqueous ammonia solution, forming silicon dioxide, calcium fluoride and ammonium fluoride.

The obtained suspension of silicon dioxide, calcium fluoride and ammonium fluoride solution is channeled into filter 4, where 1.362 kg of solid amination products are separated from 3.358 kg of ammonium fluoride solution. To remove the ammonium fluoride solution residue from the precipitate, it is washed once with 0.3 kg of hot water. Then the ammonium fluoride solution is sent to evaporator 8, where water and ammonia are stripped, and ammonium bifluoride forms.

Thus, two times less water is subjected to evaporation than in case of producing ammonium bifluoride from an aqueous solution of hexafluorosilicic acid via one stage of amination.

This pre-evaporated ammonium bifluoride is sent at a flowrate of 80 mg/s to tunnel burner type reactor 5, which also receives a 121 mg/s supply of oxygen and methane at 18 mg/s, forming a mixture of hydrogen fluoride, nitrogen and water. Next, the hydrogen fluoride and water mixture is sent to liquid phase separation unit 6 and separated from the non-condensable combustion products. Next, the mixture of HF and water is sent to water separation unit 7 to remove the water. This unit is a reactor, into which 93% sulfuric acid is fed in addition to the water-containing product, which produces HF, with a residual 0.02% water content and 75% sulfuric acid in the amount 7.34 kg per 1 kg of HF.

As evident from the data above, the issue facing the patent's authors has been resolved, namely that of creating a method of processing HSA to obtain hydrogen fluoride and making it possible to lower energy consumption of the process at the evaporation stage by at least twice.

This patent relates to the byproduct recovery of mineral raw materials in the chemical industry, namely, processing aqueous solutions of hexafluorosilicic acid (HSA) formed specifically during the process of producing phosphoric acid with hydrogen fluoride (HF). This method consists of neutralizing an aqueous solution of HSA with an alkaline agent to produce ammonium fluoride and subsequently combusting it in a fire of an oxygen-containing oxidant and a hydrogen-containing fuel. It is characterized by the alkaline neutralization, which occurs in two stages. In the first stage, the aqueous hexafluorosilicic acid solution is neutralized with an alkaline agent to obtain a suspension of the correspondent hexafluorosilicate in water, after which the water is removed from the suspension. In the second stage, solid hexafluorosilicate is treated with an ammonia-containing agent to produce an aqueous solution of ammonium fluoride. Its solid products are filtered, then the aqueous ammonium fluoride solution is burned in an oxygen-containing oxidant. Hydrogen fluoride and water are condensed from the combustion products, and then the hydrogen fluoride is extracted. The technical result achieved by applying the proposed patent consists in the reduction of energy costs due to the removal of water, which is introduced into the process cycle with the hexafluorosilicic acid, by way of synthesizing a intermediate hexafluorosilicate poorly soluble in water, then crystallizing and separating it from water through filtration, centrifugation or any other method that leads to a significant reduction in energy consumption at the stage of separating water from ammonium bifluoride in the evaporator.

The invention claimed is:

1. A method of processing hexafluorosilicic acid (HSA) to produce hydrogen fluoride, the method comprising:
   neutralizing an aqueous solution of HSA with an alkaline agent to produce ammonium fluoride or its aqueous solution, and
   combusting the ammonium fluoride in a fire of an oxygen-containing oxidant and a hydrogen-containing fuel, wherein the hydrogen-containing fuel comprises at least one hydrocarbon.

2. The method of claim 1, wherein neutralizing the aqueous solution of HSA with the alkaline agent occurs in two stages.

3. The method of claim 2, wherein in a first stage of the two stages, the aqueous solution of HAS is neutralized with the alkaline agent to obtain a suspension of a corresponding hexafluorosilicate in water, after which the water is removed from the suspension.

4. The method of claim 3, wherein in a second stage of the two stages, solid hexafluorosilicate is treated with an ammonia-containing agent to produce the aqueous solution of ammonium fluoride.

5. The method of claim 4, wherein solid products are filtered.

6. The method of claim 4, wherein the aqueous ammonium fluoride solution is burned in an oxygen-containing oxidant.

7. The method of claim 1, wherein the hydrogen fluoride and water are condensed from combustion products, and then the hydrogen fluoride is extracted.

8. The method in claim 1, wherein ammonia or ammonia water is used as a ammonia-containing agent.

9. The method in claim 1, wherein the aqueous ammonium fluoride solution is preliminarily subjected to evaporation and the resulting ammonium bifluoride is sent to combustion in an oxygen-containing oxidant.

10. The method in claim 1, wherein a mole ratio between the alkaline agent and HSA is from 1 to 2.

11. The method in claim 1, wherein the at least one hydrocarbon includes methane.

\* \* \* \* \*